(12) United States Patent
Silva (10) Patent No.: US 8,872,883 B2
(45) Date of Patent: Oct. 28, 2014

(54) VISTORE

(76) Inventor: Octavio Cesar Silva, Melbourne, CA (US)

(*) Notice: Subject to any disclaimer, the term of this patent is extended or adjusted under 35 U.S.C. 154(b) by 179 days.

(21) Appl. No.: 13/485,871

(22) Filed: May 31, 2012

(65) Prior Publication Data

US 2013/0201277 A1 Aug. 8, 2013

Related U.S. Application Data

(60) Provisional application No. 61/554,950, filed on Nov. 2, 2011.

(51) Int. Cl.
*H04N 7/15* (2006.01)
*H04L 12/18* (2006.01)

(52) U.S. Cl.
CPC ............ *H04N 7/15* (2013.01); *H04N 7/155* (2013.01); *H04L 12/1831* (2013.01)
USPC .................. 348/14.08; 348/14.09; 348/14.12

(58) Field of Classification Search
CPC ......... H04N 7/15; H04N 7/152; H04N 7/155; H04N 7/14; H04N 7/141; H04N 7/147; H04L 12/1831
USPC ............................................. 348/14.01–14.16
See application file for complete search history.

(56) References Cited

U.S. PATENT DOCUMENTS

| | | | |
|---|---|---|---|
| 2010/0158232 A1* | 6/2010 | Sylvain | 379/202.01 |
| 2011/0072366 A1* | 3/2011 | Spencer et al. | 715/757 |
| 2011/0145431 A1* | 6/2011 | Momchilov et al. | 709/231 |
| 2012/0169831 A1* | 7/2012 | Nietfeld et al. | 348/14.08 |
| 2012/0224021 A1* | 9/2012 | Begeja et al. | 348/14.08 |

* cited by examiner

*Primary Examiner* — Melur Ramakrishnaiah (57) ABSTRACT

ViSTORE is a video teleconferencing system used with networked devices and is capable of storing all or parts of video conferencing sessions on demand that can be played back at a later time. The system consists of a web portal, where all multimedia data is stored, and a software application hosted in the networked devices. The networked devices can be any wired or wireless devices such as laptops and smart phones. The system is capable of hosting multiple videoconferencing parties and each user is capable of storing any part of a given user video session. The system also can play concurrently video feeds, such as a live TV channel, or video clips, such as those of news websites. In addition, the system can display simultaneously multimedia such as photos and images. Finally, the system allows user to create and display notes and MS Office applications files.

36 Claims, 12 Drawing Sheets

ViSTORE System Architecture

Figure 1. ViSTORE System Architecture

Figure 2. Software Application Main Menu

Figure 3. "Open Live/Stored Multimedia" Item

Figure 4. Layout of "ViStore Portal" Item to Open File at the Portal

Figure 5. Page Layout of "Store Video or Multimedia" Item

Figure 6. Main Page of ViSTORE System Portal

Figure 7a. Generalized of Flow Chart of the Videoconferencing System Method

Figure 7b. Generalized of Flow Chart of the Videoconferencing System Method (Continued)

Figure 7c. Generalized of Flow Chart of the Videoconferencing System Method (Continued)

Figure 7d. Generalized Flow Chart of the Videoconferencing System Method (Continued)

Figure 7e. Generalized Flow Chart of the Videoconferencing System Method (Continued)

Figure 7f. Generalized Flow Chart of the Videoconferencing System Method (Continued)

ViSTORE

CROSS REFERENCE TO RELATED APPLICATIONS

This is a non-provisional patent submittal corresponding to provisional patent application No: 61554950, ViSTORE System, submitted on Nov. 2, 2011.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not Applicable.

DESCRIPTION OF DRAWINGS

FIG. 1 shows the overall architecture of the system. Video conferencing sessions can be set up among users with network devices. A video conferencing session can be recorded on demand at any time at the web portal.

SUMMARY OF THE INVENTION

ViSTORE is a video teleconferencing system used with networked devices and is capable of storing all or parts of video conferencing sessions on demand. The recorded video sessions can be played back at a later time. ViSTORE consists of a web portal and a software application hosted in the networked devices. The networked devices can be any wired or wireless devices such as PCs, laptops and smart phones. The system is capable of hosting multiple videoconferencing parties and each user is capable of storing any part of a given user video session. The system also can play concurrently video feeds such as a live TV channel and another stored video conferencing session or video clip. In addition, the system can display simultaneously multimedia such as photos and images.

The videos and multimedia data are stored at a central location, the web portal. Users can download previously recorded video sessions or multimedia data at any time from this portal via any connection to the Internet.

System Design

A user using any network device can call another user having a networked device to set up a video session. The calls can be one-to-one or one-to-many. The network device can display simultaneously twelve sessions. Each session can be a video conferencing connection, a live video feed, a prerecorded video session, a pre-recorded video feed or a multimedia display such as an image.

When users accept video calls, the video sessions appear in the network device screen along with the displays for live feeds, prerecorded feeds or sessions, or multimedia data. The software has the functionality to initiate or end video calls. The software also has the functionality to make personal notes on a note pad during a video session. Other software applications can be displayed during a video session. Examples include Microsoft Office applications such as Power Point presentations.

Any user during a video session can initiate a recording of that video session. The command to record a video session is sent to the web portal which records the video conferencing along with pertinent data, including the date, time, and the users involved in that session.

The system offers security settings. The video sessions can be encrypted or can be enabled via a Virtual Private Network.

All products stored in the portal are indexed by unique identifiers, including ID, type and date.

Figure 1:
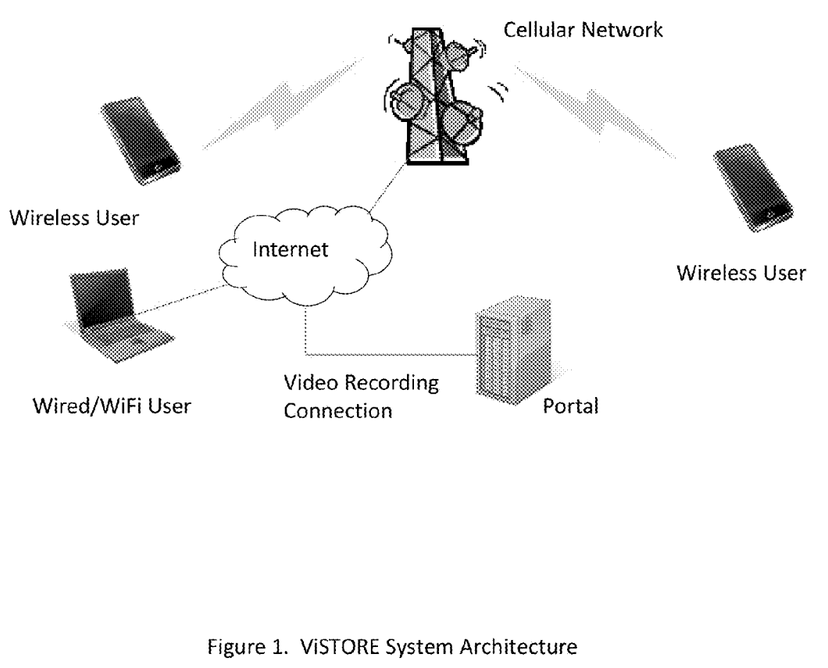
Figure 2:
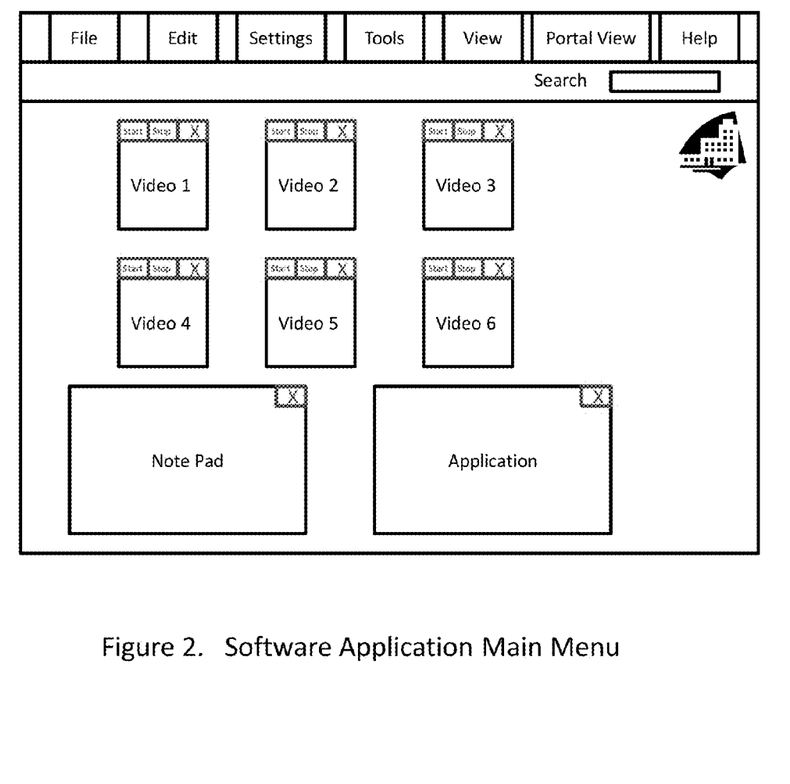
FIG. 2 shows the main page of the ViSTORE System software application hosted on computing devices.

As shown in FIG. 2, the ViSTORE software application hosted in computing device is divided in seven menu categories:

a. File
b. Edit
c. Options
d. View
e. Portal View
f. Tools
g. Help

The File menu is divided as follows:

a. Open Call: Calls another party. Calls up to 12 sessions. Once a call is opened, it can be closed by the Close Session option in the File Menu. The choices are phone numbers or e-mail addresses.
b. Close Session: Ends a video conferencing session individually or a multimedia session. This function is also enabled by a "Close" button above each video display.
c. Open Live/Stored Multimedia: Option to open a multimedia file from a multimedia website or the portal. Choices to open include videos, images and photos. Multimedia websites include abc.com, nbc.com, cbs.com, msnbc.com, cnn.com, fox.com and YouTube. To close a session, the Close Session function in the File Menu is also used.
d. Start Recording: Automatically creates an entry of selected video conference or multimedia feeds at the portal and starts recording. This function is also enabled by a "Start" button above each video display.
e. Stop Recording: Stops recording of video session. This function is also enabled by a "Stop" button above each video display.
f. Open Application: Opens a Microsoft Office application file: Word, Excel or Power Point.
g. Close Application: Closes a MS Office application.
h. Open Notepad: Opens a window to take notes that can be stored locally in the computer, a smart phone or the portal.
i. Close Notepad: Closes Notepad
j. Store Video or Multimedia: Stores all or portion of video conferencing session or multimedia at the Portal. This is an alternative to the Start Recording function in the File Menu which is automatic. This option, on the other hand, is manual. The Stop Recording function in the File Menu is also used to stop recording.
k. Print: Prints notes or MS applications.
l. Print Preview: Previews material for printing.

m. Save: Saves file to local disk. The item is selected by clicking on it.

The Edit menu has the following options:
a. Clipboard: Shows the contents of the clipboard and options to delete or paste contents.
b. Select all: selects all the contents in an application or Notepad
c. Delete: Deletes a file.
d. Cut: Cuts a file.
e. Copy: Copies a file to the clipboard.
f. Paste: Pastes the contents of an individual file.
g. Find: Searches for a specific file.

The Options menu has the following options:
a. Encrypt: Enables encryption of a video conferencing session.
b. VPN: Enables VPN of a video conferencing session.
c. Videoconferencing Session: Selects the number of simultaneous video sessions.

The Tools menus has the following options:
a. Security: Provides the settings for an encrypted session. Encryption includes AES and Triple DES. Provides the settings for a VPN session.
b. Video Compression: Selects the video compression standard.
c. Audio: Selects the setting of the V/C audio, including compression type.

The View menu has the following options:
a. Toolbars: Selects Toolbars: Toolbars includes icons from the File and Edit menus.
b. Zoom: Zooms on a specific videoconferencing or multimedia session on the screen.
c. Full screen: Projects a specific videoconferencing or multimedia session on a full screen.

The Help menu has the following options:
a. Search: Searches a specific topic in the search field.
b. Index: Provides an index of all the Help items.
c. About: Displays the current version of the ViSTORE system software.

The Search field shown in FIG. 2 searches for the item typed in the field.

Figure 3:
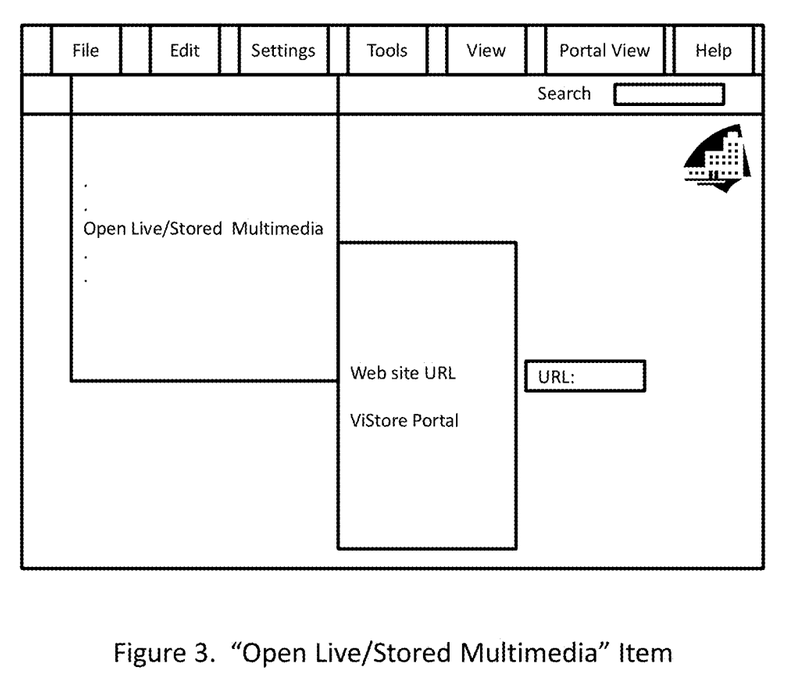
FIG. 3 shows the "Open Live/Stored Multimedia" item that allows access to files from a website such as those from nbc.com or the ViSTORE System Portal.

The "Open Live/Stored Multimedia" item in the File Menu is arranged as shown in FIG. 3. Two options are given as shown in the File pull down menu. The first option to open "Website URL", allows a user to type in the URL of a website in URL field. This action takes the user to the multimedia website in a separate window and allows him to select a particular multimedia file. This file is incorporated in one of the display sessions shown in FIG. 2. This is enabled by an interworking function that redirects the video in the website to the ViSTORE system.

Figure 4:
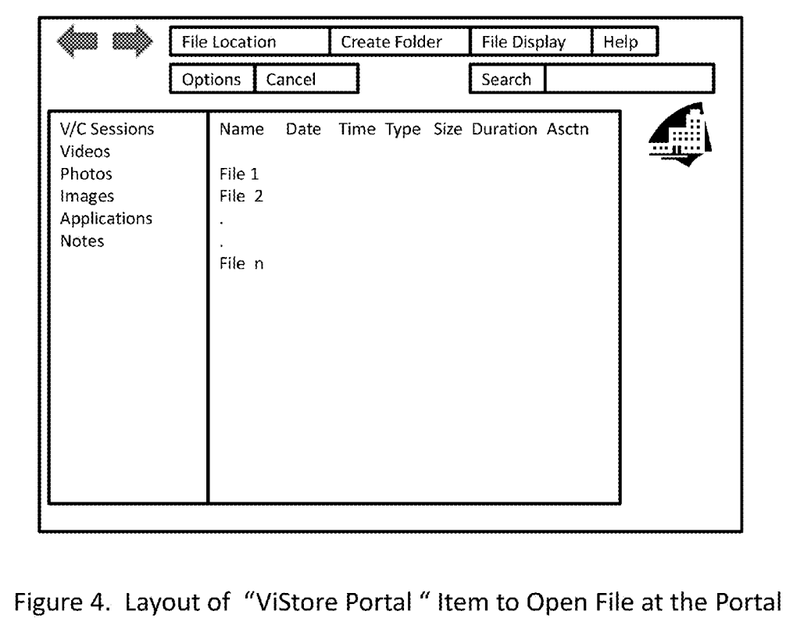
FIG. 4 shows the page layout to open a file stored at the ViSTORE System Portal.

The other option in FIG. 3 is to click on "ViSTORE Portal" to open a file from the ViSTORE System Portal. This action takes the user to the list of files that can be opened from his ViSTORE Portal page. This page is shown in FIG. 4. This page is arranged in two sections. The section on the left has folders for videoconferencing sessions, videos, photos, images, applications and notes. The section on the rights displays the files in each of these folders including their properties. The properties are File Name, Date, Time, File Type, Size, Duration and Association.

The menu selections in FIG. 4 are as follows:
a. Options:
 i. Delete: Deletes a file.
 ii. Cut: Cuts file.
 iii. Copy: Copies a file.
 iv. Paste: Pastes a copied file.
 v. Rename: Renames a file
 vi. Properties: Displays file properties
 vii. Close: Closes open action
b. Create Folder: Create a folder in the main folders.
c. File Display: Displays files as icons or as a list.
d. Cancel: Cancels an action.
e. Help: Provides help options in this page.
f. File Location: Display the file location in the file tree.
g. Search: Searches for files in this page.
h. Back Arrow: Takes user to previous action.
i. Forward Arrow: Takes user to forward action.

Figure 5:
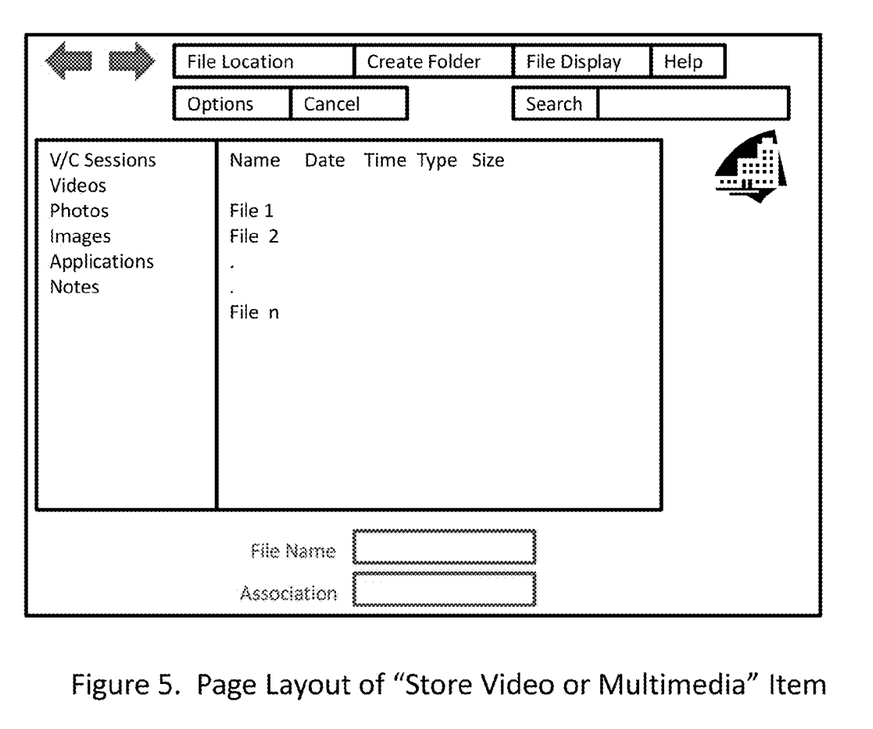
FIG. 5 show the page layout to store a file at the ViSTORE System Portal.

The page layout of the "Store Video or Multimedia" item in the File Menu is shown in FIG. 5. The item to be saved is selected by clicking on it. This page is arranged in two sections. The section on the left has folders for videoconferencing sessions, videos, photos, images, applications and notes. The section on the right displays the files in each of these folders including their properties. The properties are File Name, Date, Time, File Type, Size, Duration and Association.

The menu selections in FIG. 5 are as follows:
a. Options:
 i. Delete: Deletes a file.
 ii. Cut: Cuts file.
 iii. Copy: Copies a file.
 iv. Paste: Pastes a copied file.
 v. Rename: Renames a file
 vi. Properties: Displays file properties
 vii. Close: Closes open action
b. Create Folder: Creates a folder in the main folders.
c. File Display: Displays files as icons or as a list.
d. Cancel: Cancels an action.
e. Help: Provides help options in this page.
f. File Location: Display the file location in the file tree.
g. Search: Searches for files in this page.
h. Back Arrow: Takes user to previous action.
i. Forward Arrow: Takes user to forward action.
j. File Name field: The file name is entered in this field.
k. Association field: The Association object name is entered in this field.

Each videoconferencing or multimedia display shown in FIG. 2 is stored as a separate file in the ViSTORE Portal. These files are associated with this particular session. The user has the option to open all or a subset of the videoconferencing or multimedia files for a given session at a later time. Files associated for a particular session are annotated in the Association field in the file properties.

Figure 6:
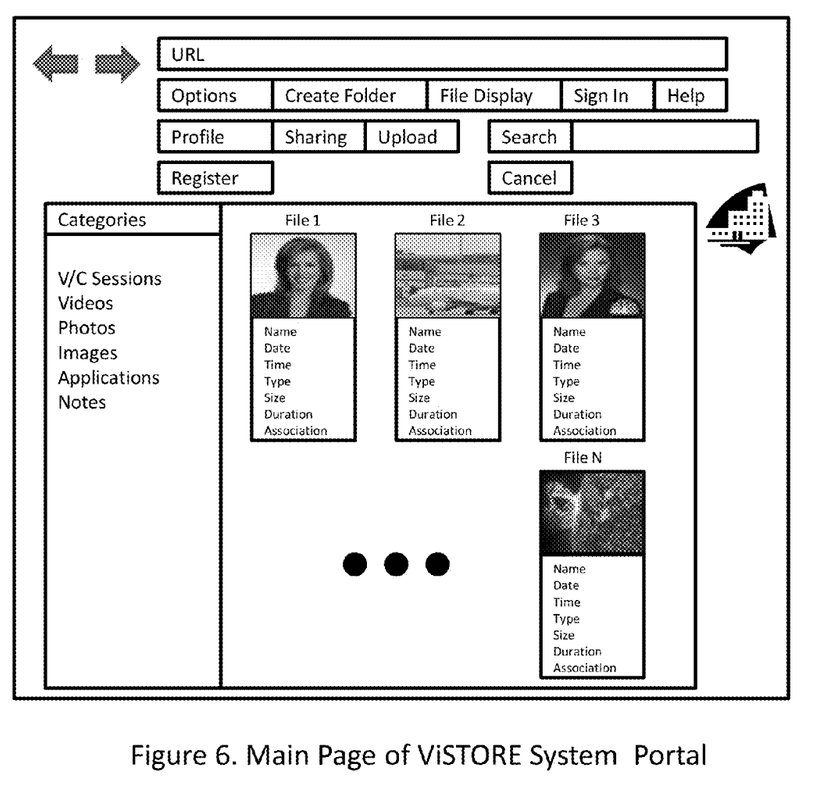
FIG. 6 shows the main page of the ViSTORE System Portal page. This portal can be accessed from the software application hosted in computing devices or a web browser.

Clicking the Portal View item in the ViSTORE system main menu categories takes the user to the ViSTORE System Portal main page in a separate window as shown in FIG. 6. This page can also be accessed by typing its URL in a web browser. This page is arranged in two sections. The section on the left has folders for videoconferencing sessions, videos, photos, images, applications and notes. The section on the right displays the files in each of these folders including their properties. The properties are File Name, Date, Time, File Type, Size, Duration and Association.

The menu selections in the ViSTORE Portal main page, FIG. 6, are as follows:
a. Sign In: Allows a user to enter the Portal with a user name and password.
b. Register: Allows a user to register in the portal.
 i. Enter User Name: Field to enter user name
 ii. Enter e-mail address: Field to enter e-mail address
 iii. Enter Password: Field to enter password
 iv. Confirm Password: Field to confirm password
c. Options:
 i. Delete: Deletes a file.
 ii. Cut: Cuts file.

iii. Copy: Copies a file.
iv. Paste: Pastes a copied file.
v. Rename: Renames a file
vi. Properties: Displays file properties
vii. Close: Closes open action
d. Profile: Contains user information, including name and e-mail address. Password can be changed in this section.
e. Sharing: User selects other users to view selected files. When clicked, the following fields are displayed:
  i. Allow users to see my files: Field clicked to enable this action.
  ii. Enter user name: Field to enter user names allowed to see my files.
  iii. Block users: Block selected users from seeing files
f. Upload: Uploads a given file from any local drive or website.
g. Create Folder: Creates a folder in the main folders.
h. File Display: Displays files as icons or as a list.
i. Cancel: Cancels an action.
j. Help: Provides help options in this page.
k. Search: Searches for files in this page.
l. Back Arrow: Takes user to previous action.
m. Forward Arrow: Takes user to forward action.

Figure 7A:
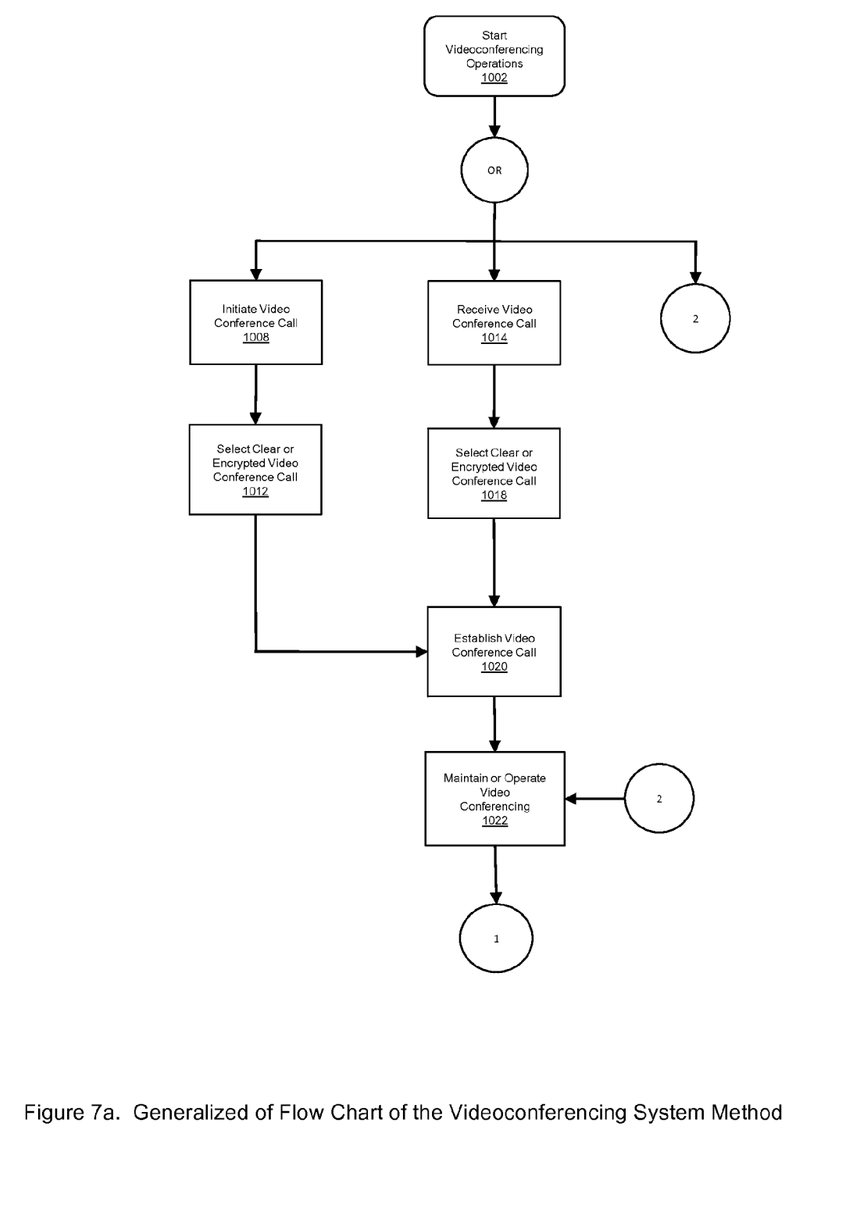
FIGS. 7a-7f represent generalized flowcharts of the operation of the videoconferencing system.
Figure 7B:
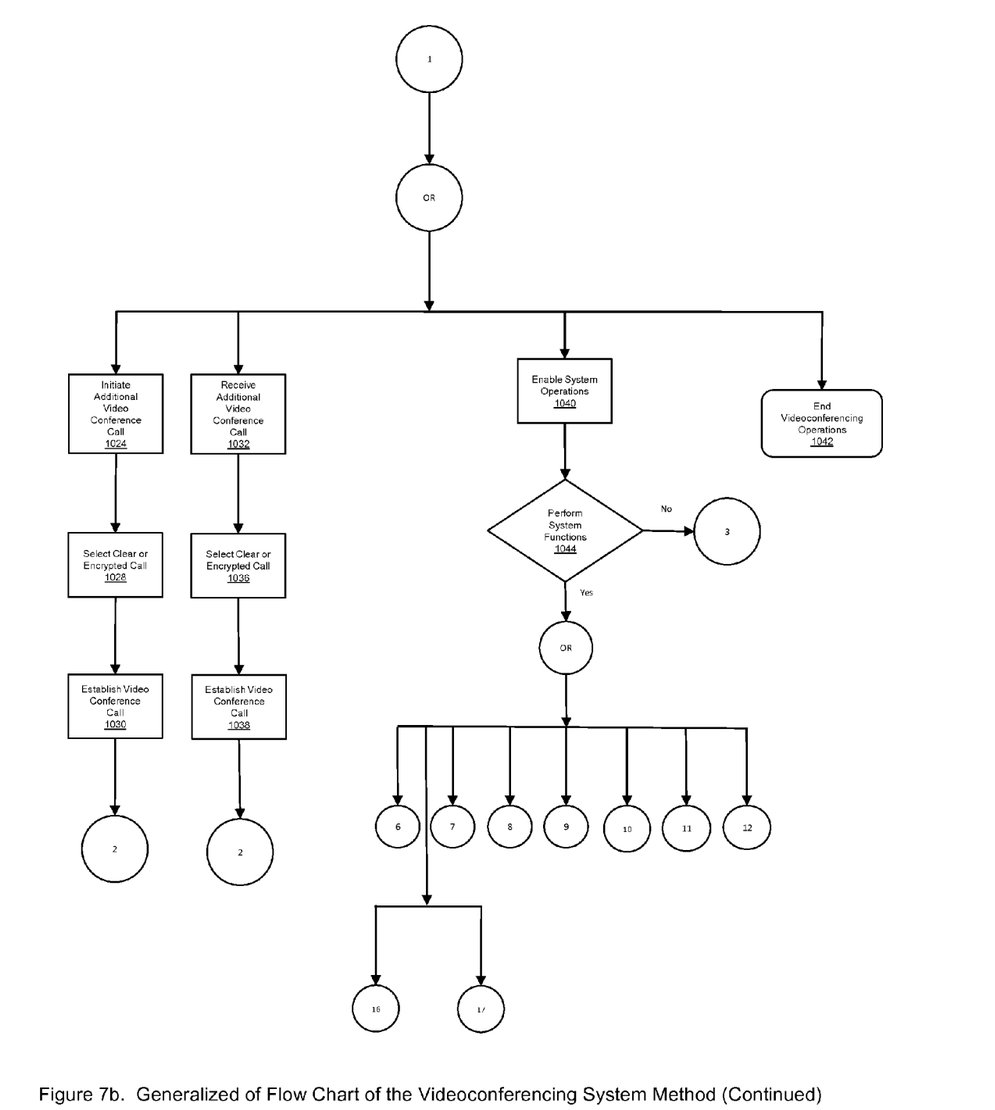
Figure 7C:
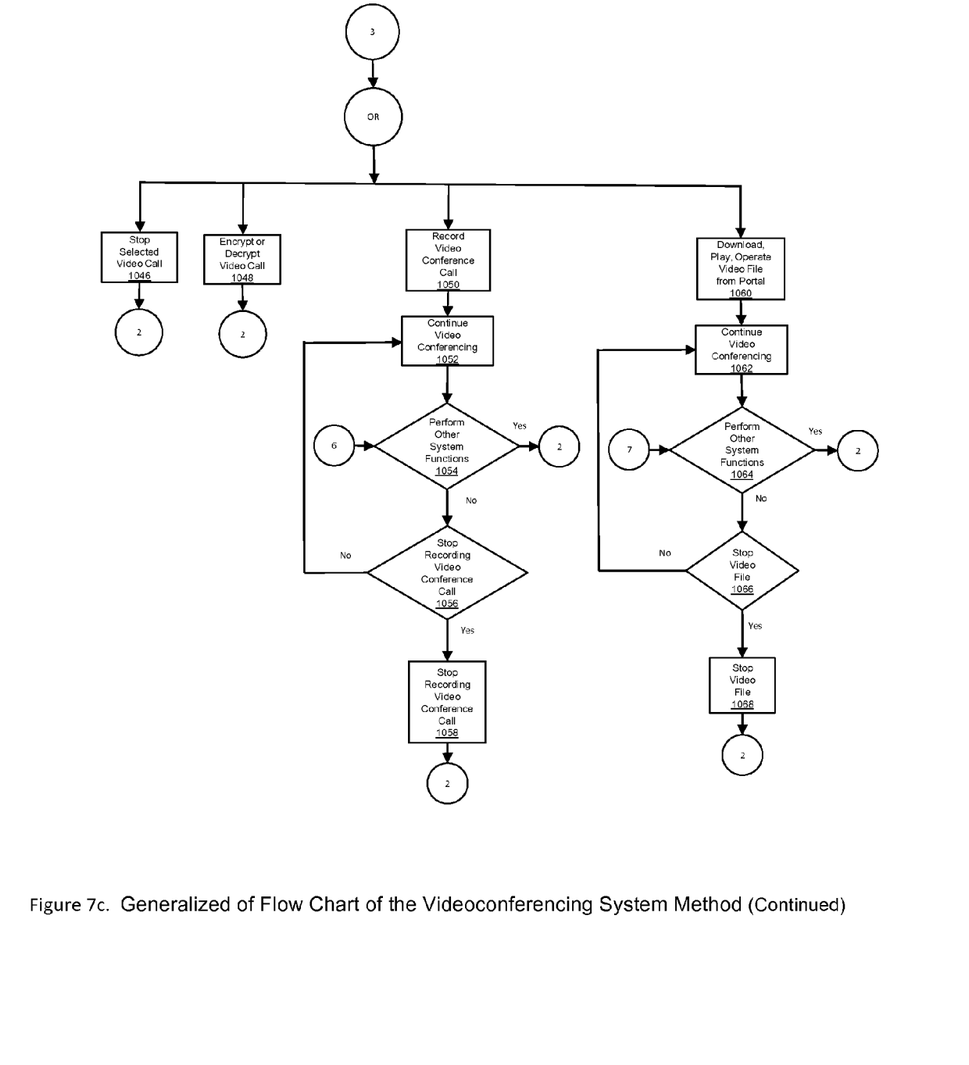
Figure 7D:
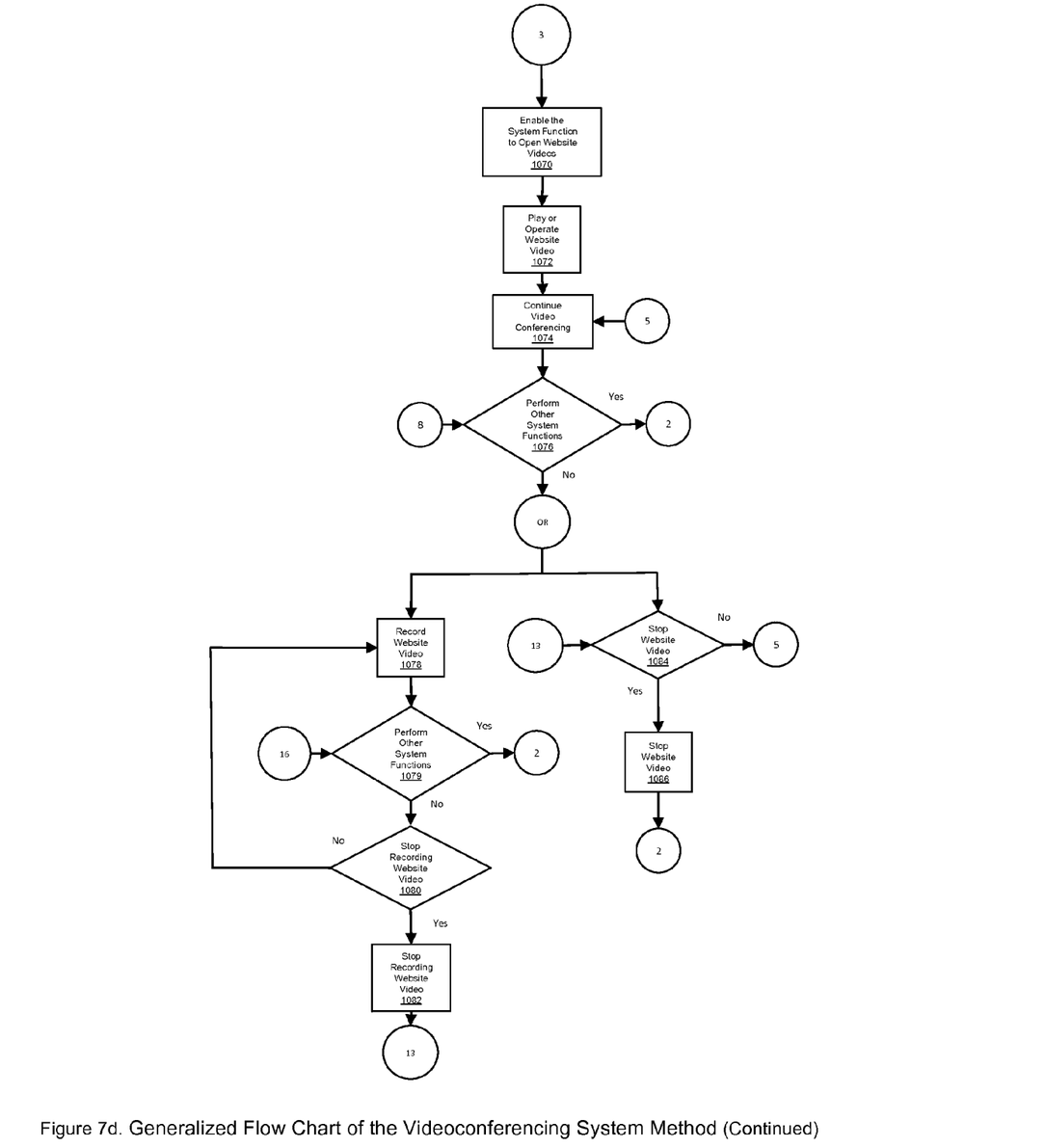
Figure 7E:
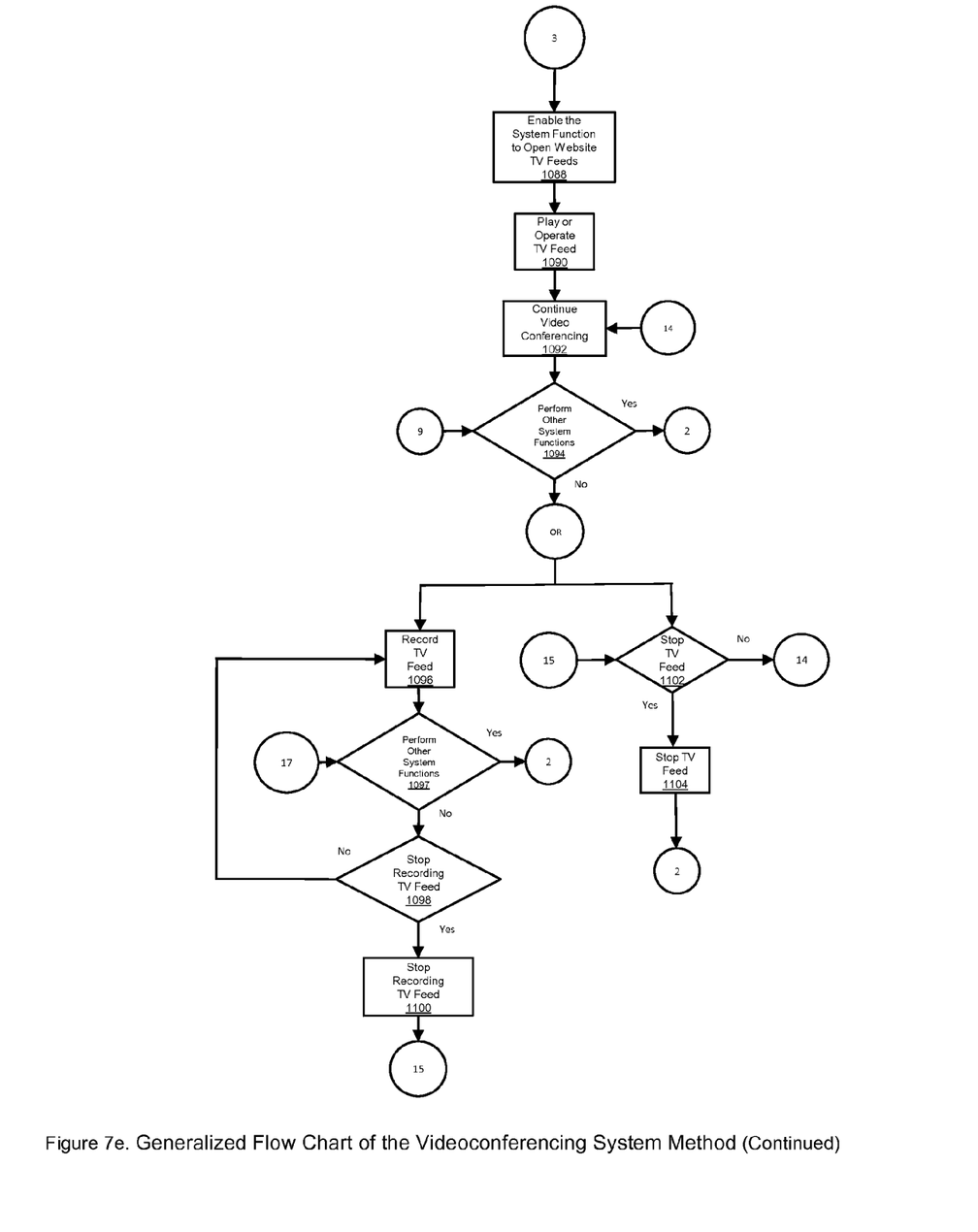
Figure 7F:
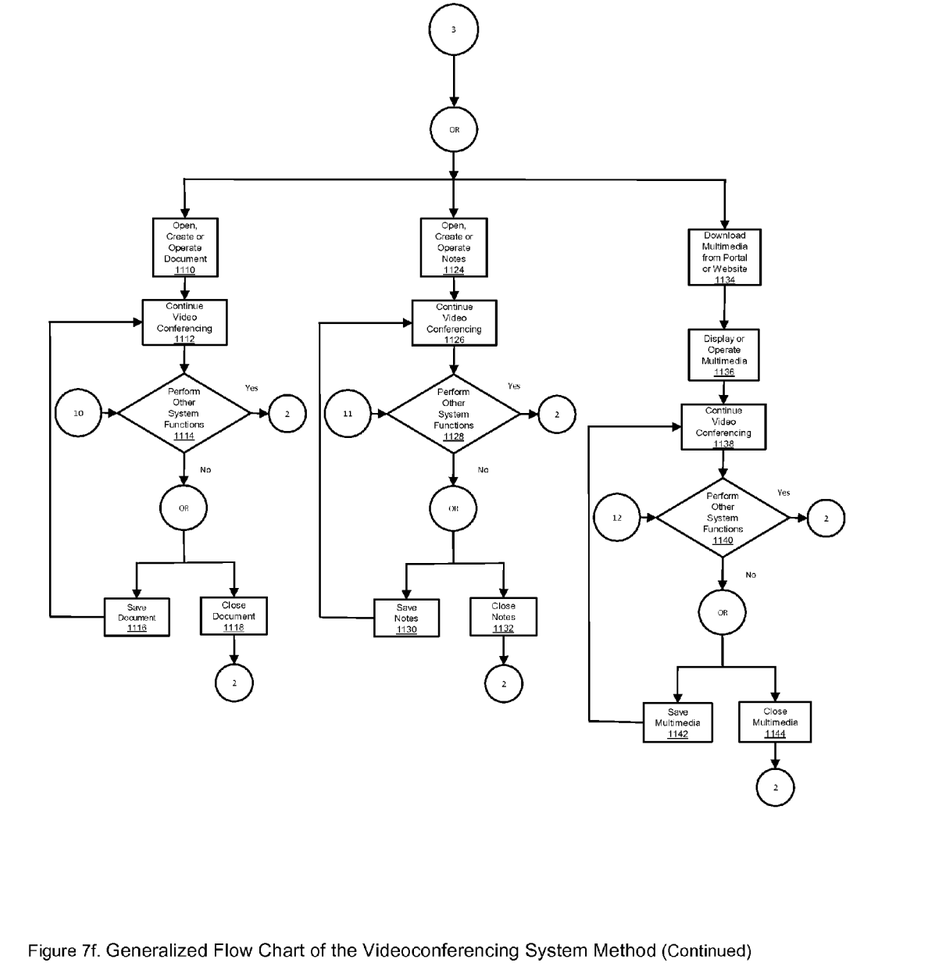

FIGS. 7*a-f* represent generalized flow charts that describe the operation of the video conferencing system, using network devices. FIG. 7*a* depicts the initial process of Start Videoconferencing Application 1002 for Initiate Video Conference Call 1008 or Receive Video Conference Call 1014, and transitioning to Maintain or Operate Video Conferencing 1022 from where any maintenance, operation or functionality of the system can be enabled. FIG. 7*b* shows the main features that can be enabled, including Initiate Additional Video Conference Call 1024, Receive Additional Video Conference Call 1032, Enable System Operations 1040, Perform System Functions 1044 such as saving files or documents, and End Video Conference 1042. FIGS. 7*c-f* depict the main operations of the video conferencing application entered from Enable System Operations 1040, including Record Video Conferencing Call 1050 for recording video conferencing calls in the central web portal or the network device, Download, Play, Operate Video File from Portal 1060, Enable the System Function to Open Website Videos 1070 for opening website videos and saving them to the central web portal on demand, Enable the System Function to Open Website TV Feeds 1088 for opening a live TV channel that is being played at a website or from a TV distribution network, Open, Create or Operate Document 1110 for opening, creating or operating a Microsoft Office document and saving it to the central web portal, Open, Create or Operate Notes 1124 for opening, creating or operating notes in the video conferencing application and saving them to the central web portal, Download Multimedia from Portal or Website 1134, Encrypt or Decrypt Video Call 1048 and Stop Selected Video Call 1046. Multimedia in Download Multimedia from Portal or Website 1134 includes pictures and images that can be saved at the central web portal. Each video operation has a "Perform Other System Functions" (e.g. 1054) that allows the system to perform other functions concurrently in the system. For example, while performing Record Video Conferencing Call 1050 the Perform Other System Functions 1054 allows the system to go to Maintain or Operate Video Conferencing 1022 and Enable System Operations 1040 and Download, Operate Video File from Portal 1060 to play a video file stored in the portal concurrently while recording the video conferencing call in Record Video Conferencing Call 1050.

The invention claimed is:

1. A method to establish videoconferencing sessions in a videoconferencing system from a network device, comprising: displaying a human machine interface (HMI) on said network device, wherein the HMI displays contact information for one or more videoconference users, wherein said contact information is not otherwise associated with said network device; receiving user input to the HMI, wherein the user input specifies one or more videoconferencing users to establish one or more videoconferencing sessions in the videoconferencing system; receiving further user input to the HMI during the videoconference, wherein the further user input consists of one or more commands thereby enabling one or more functions to modify the operation of said videoconference sessions in the videoconferencing system; wherein the one or more commands comprise a command for storing data in a central web portal; wherein the one or more commands further comprise a command for retrieving data from said central web portal.

2. The method in claim 1 wherein storing data further comprises storing said videoconference sessions in said central web portal.

3. The method in claim 1 wherein retrieving data further comprises retrieval of said videoconference sessions from said central web portal for playing concurrently with the live videoconferencing sessions in said network device.

4. The method in claim 1 further comprising the playing of media content from a website concurrently with the live videoconferencing sessions, using embedded browser functions and an embedded plug-in, the media content further disseminated to other videoconference users by the content request user.

5. The method in claim 4 wherein storing data further comprises storing said media content from said website in said central web portal.

6. The method in claim 4 wherein retrieving data further comprises retrieving media content from said central web portal for playing concurrently with the live videoconferencing sessions in said network device.

7. The method in claim 1 further comprising downloading and displaying of multimedia data, including photographs and images, concurrently with the videoconferencing sessions.

8. The method in claim 7 wherein storing data further comprises storing said multimedia data in said central web portal.

9. The method in claim 7 wherein retrieving data further comprises retrieving said multimedia data from said central web portal for playing concurrently with the videoconferencing sessions in said network device.

10. The method in claim 1 further comprising the creation and displaying of notes in a virtual notepad concurrently with the live videoconferencing sessions.

11. The method in claim 10 wherein storing data further comprises storing said notes from said virtual notepad in said central web portal.

12. The method in claim 10 wherein retrieving data further comprises retrieving said notes from said central web portal for playing concurrently with the live videoconferencing sessions in said network device.

13. The method in claim 1 further comprising the creation and displaying of Microsoft Office documents concurrently with the live videoconferencing sessions.

14. The method in claim 13 wherein storing data further comprises storing said Microsoft Office documents in said central web portal.

15. The method in claim 13 wherein retrieving data further comprises retrieving said Microsoft Office documents from said central web portal for playing concurrently with the live videoconferencing sessions in said network device.

16. The method in claim 1 further comprising the playing of TV feeds from a website concurrently with the videoconferencing sessions, using embedded browser functions and an embedded plug-in, the TV feeds further disseminated to other videoconference users by the content request user.

17. The method in claim 16 wherein storing data further comprises storing said TV feeds from said website in said central web portal.

18. The method in claim 16 wherein retrieving data further comprises retrieving said TV feeds from said central web portal for playing concurrently with the videoconferencing sessions in said network device.

19. A non-transitory computer-usable medium embodying computer program code, the computer program code comprising computer executable instructions to establish video conferencing sessions in a video conferencing system wherein the instructions are executed by processing logic to; display a human machine interface (HMI) on said network device, wherein the HMI displays contact information for one or more videoconference users, wherein said contact information is not otherwise associated with said network device; receive user input to the HMI, wherein the user input specifies one or more videoconferencing users to establish one or more videoconferencing sessions in the videoconferencing system; receive further user input to the HMI during the videoconference, wherein the further user input consists of one or more commands thereby enabling one or more functions to modify the operation of said videoconference sessions in the videoconferencing system; wherein the one or more commands comprise a command for storing data in a central web portal; wherein the one or more commands further comprise a command for retrieving data from said central web portal.

20. The non-transitory computer-usable medium in claim 19 wherein storing data further comprises storing videoconferencing sessions in said central web portal.

21. The non-transitory computer-usable medium in claim 19 wherein retrieving data further comprises retrieving videoconferencing sessions from said central web portal for playing concurrently with the live videoconferencing sessions.

22. The non-transitory computer-usable medium in claim 19 further comprising the playing of media content from a website concurrently with the videoconferencing sessions, using embedded browser functions and an embedded plug-in, the media content further disseminated to other videoconference users by the content request user.

23. The non-transitory computer-usable medium in claim 22 wherein storing data further comprises the storing said media content from said website in said central web portal.

24. The non-transitory computer-usable medium in claim 22 wherein retrieving data further comprises retrieval of said media content from said central web portal for playing concurrently with the videoconferencing sessions in said network device.

25. The non-transitory computer-usable medium in claim 19 further comprising downloading and displaying of multimedia data, including photographs and images, concurrently with the videoconferencing sessions.

26. The non-transitory computer-usable medium in claim 25 wherein storing data further comprises storing said multimedia data in said central web portal.

27. The non-transitory computer-usable medium in claim 25 wherein retrieving data further comprises retrieving said multimedia data from said central web portal for playing concurrently with the videoconferencing sessions in said network device.

28. The non-transitory computer-usable medium in claim 19 further comprising the creation and displaying of notes in a virtual notepad concurrently with the live videoconferencing sessions.

29. The non-transitory computer-usable medium in claim 28 wherein storing data further comprises storing said notes from said virtual notepad in said central web portal.

30. The non-transitory computer-usable medium in claim 28 wherein retrieving data further comprises retrieving said notes from said central web portal for playing concurrently with the videoconferencing sessions in said network device.

31. The non-transitory computer-usable medium in claim 19 further comprising the creation and displaying of Microsoft Office documents concurrently with the videoconferencing sessions.

32. The non-transitory computer-usable medium in claim 31 wherein storing data further comprises storing said Microsoft Office documents in said central web portal.

33. The non-transitory computer-usable medium in claim 31 wherein retrieving data further comprises retrieving said Microsoft Office documents from said central web portal for playing concurrently with the videoconferencing sessions in said network device.

34. The non-transitory computer-usable medium in claim 19 further comprising the playing of TV feeds from a website concurrently with the videoconferencing sessions, using embedded browser functions and an embedded plug-in, the TV feed content further disseminated to other videoconference users by the content request user.

35. The non-transitory computer-usable medium in claim 34 wherein storing data further comprises storing said TV feeds from said website in said central web portal.

36. The non-transitory computer-usable medium in claim 34 wherein retrieving data further comprises retrieving said TV feeds from said central web portal for playing concurrently with the videoconferencing sessions in said network device.

* * * * *